(12) United States Patent
Yamada

(10) Patent No.: US 9,940,081 B2
(45) Date of Patent: Apr. 10, 2018

(54) PROCESSING REQUEST MANAGEMENT SYSTEM AND DEVICE AND NON-TRANSITORY COMPUTER READABLE MEDIUM

(71) Applicant: FUJI XEROX CO., LTD., Tokyo (JP)

(72) Inventor: Junya Yamada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/443,025

(22) Filed: Feb. 27, 2017

(65) Prior Publication Data

US 2018/0004459 A1 Jan. 4, 2018

(30) Foreign Application Priority Data

Jul. 4, 2016 (JP) ................................. 2016-132553

(51) Int. Cl.
*G06F 3/12* (2006.01)
(52) U.S. Cl.
CPC ............ *G06F 3/126* (2013.01); *G06F 3/1205* (2013.01); *G06F 3/1268* (2013.01); *G06F 3/1292* (2013.01)
(58) Field of Classification Search
USPC ....................................................... 358/1.15
See application file for complete search history.

(56) References Cited

U.S. PATENT DOCUMENTS

2015/0092233 A1\* 4/2015 Park ..................... G06F 3/1288
358/1.15

FOREIGN PATENT DOCUMENTS

JP 5838682 B2 1/2016

OTHER PUBLICATIONS

Masakazu, Job Execution Control Device Portable Terminal Device Job Execution System and Program, Apr. 11, 2013; Machine Translated Japanese Patent Application Publication; JP2013-065197; All Pages.*

\* cited by examiner

*Primary Examiner* — Ngon Nguyen
(74) *Attorney, Agent, or Firm* — Oliff PLC

(57) ABSTRACT

A processing request management system includes a user terminal used by a user, a set of image processing devices, and a management device connected to each other via a communication network. The user terminal includes a first processing request information sender that sends processing request information to the management device. The processing request information is used for instructing an image processing device to execute processing. The management device includes a selector and a second processing request information sender. The selector selects a subject image processing device from the set of image processing devices, based on operating state information indicating an operating state of each of the image processing devices. The second processing request information sender sends the processing request information received from the first processing request information sender to the subject image processing device. The subject image processing device executes processing corresponding to the processing request information.

8 Claims, 14 Drawing Sheets

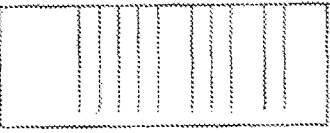

PROCESSING REQUEST MANAGEMENT SYSTEM AND DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-132553 filed Jul. 4, 2016.

BACKGROUND

Technical Field

The present invention relates to a processing request management system and device and a non-transitory computer readable medium.

SUMMARY

According to an aspect of the invention, there is provided a processing request management system including a user terminal used by a user, a set of image processing devices, and a management device connected to each other via a communication network. The user terminal includes a first processing request information sender that sends processing request information to the management device. The processing request information is used for instructing an image processing device to execute processing. The management device includes a selector and a second processing request information sender. The selector selects a subject image processing device from the set of image processing devices, based on operating state information indicating an operating state of each of the image processing devices. The second processing request information sender sends the processing request information received from the first processing request information sender to the subject image processing device. The subject image processing device executes processing corresponding to the processing request information.

BRIEF DESCRIPTION OF THE DRAWINGS

An exemplary embodiment of the present invention will be described in detail based on the following figures, wherein:

FIGS. 8A and 8B illustrate examples of a job reservation screen;

DETAILED DESCRIPTION

An exemplary embodiment will be described below with reference to the accompanying drawings.

Figure 1:
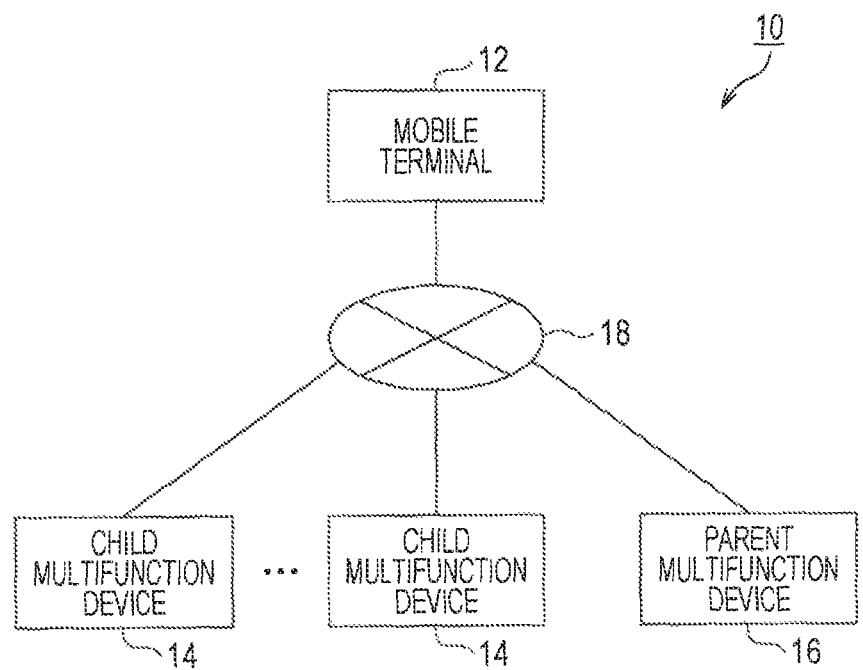
FIG. 1 is a schematic diagram of a job management system according to the exemplary embodiment.

FIG. 1 is a schematic diagram of a job management system 10, which serves as a processing request management system according to the exemplary embodiment. The job management system 10 includes a mobile terminal 12, which serves as a user terminal used by a user, plural child multifunction devices 14, which serve as a set of image processing devices, and a parent multifunction device 16, which serves as a management device. The mobile terminal 12, the plural child multifunction devices 14, and the parent multifunction device 16 are connected to each other via a communication network 18, such as the Internet or a local area network (LAN), so that they can communicate with each other. Although only one mobile terminal 12 is shown in FIG. 1, the job management system 10 may include plural mobile terminals 12 used by plural users.

Figure 2:
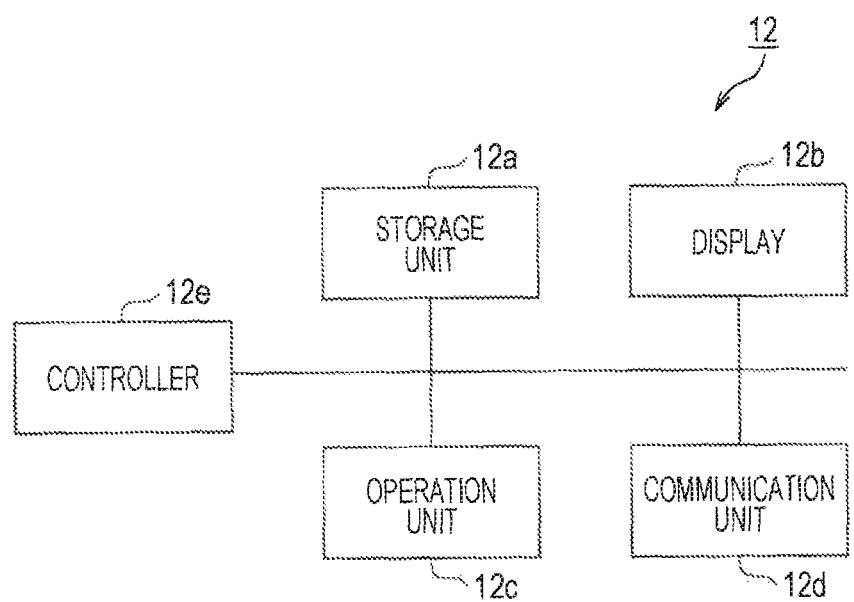
FIG. 2 is a schematic block diagram of a mobile terminal according to the exemplary embodiment.

FIG. 2 is a schematic block diagram of the mobile terminal 12. The mobile terminal 12 is a portable terminal that can be carried by a user, and is a smartphone or a tablet computer, for example.

A storage unit 12a is constituted by a read only memory (ROM) and a random access memory (RAM). In the storage unit 12a, a program for operating the individual elements of the mobile terminal 12 and processing results in the mobile terminal 12 are stored.

A display 12b is constituted by a liquid crystal display panel, for example, and displays various screens.

An operation unit 12c includes a touch panel and buttons, for example, and is used by a user to input an instruction into the mobile terminal 12.

A communication unit 12d is constituted by a wireless or wired LAN module or a mobile phone line communication module, and is used for communicating with the communication network 18. The mobile terminal 12 sends and receives various items of information (data) with the child multifunction devices 14 and the parent multifunction device 16 via the communication unit 12d. That is, the communication unit 12d serves as an information sender and an information receiver in the mobile terminal 12.

For example, the communication unit 12d sends job reservation information to the parent multifunction device 16. The job reservation information serves as processing request information for requesting a child multifunction device 14 or the parent multifunction device 16 to execute processing (including print processing, scan processing, copy processing, and fax sending processing). The job reservation information is input by a user operating the operation unit 12c. In this exemplary embodiment, processing request information is sent from the mobile terminal 12 to the parent multifunction device 16 via a child multifunction device 14, and the parent multifunction device 16 selects a child multifunction device 14 to execute processing corresponding to the processing request information and then sends the processing request information to the selected child multifunction device 14. The selected child multifunction device 14 waits for an execution instruction from the mobile terminal 12 and then executes processing corresponding to the processing request information. Hence, in this exemplary embodiment, processing request information is called "job reservation information". In this exemplary embodiment, instead of directly sending job reservation information to the parent multifunction device 16, the job reservation information is first sent to one of the plural child multifunction devices 14, and this child multifunction device 14 transfers the job reservation information to the parent multifunction device 16. This will be discussed later. Alternatively, job reservation information may be sent from the mobile terminal 12 directly to the parent multifunction device 16.

Job reservation information includes setting information indicating the content and the settings of a job. Setting information indicates, for example, the type of job (print job), the number of print copies, print size, color mode, whether to perform duplex printing, and whether to perform N-up printing (multiple pages are printed on one sheet). Job reservation information also includes a reservation ID for identifying a job reservation indicated by this job reservation information, a user ID for identifying the user sent this job reservation information, and a mobile terminal ID for identifying the mobile terminal 12 sent this job reservation information. The reservation ID may be identification information issued by the parent multifunction device 16 received the job reservation information.

Job reservation information may include specifying information for specifying plural child multifunction devices 14 as candidates which will execute processing corresponding to this job reservation information. Plural candidate child multifunction devices 14 may be specified by a user inputted a job reservation. Alternatively, a user may specify one child multifunction device 14, and plural child multifunction devices 14 positioned around the specified child multifunction device 14 may be specified automatically.

The communication unit 12d sends and receives various other items of information, which will be discussed later.

A controller 12e is constituted by a microcomputer, for example, and controls the individual elements of the mobile terminal 12 in accordance with a program stored in the storage unit 12a.

Figure 3:
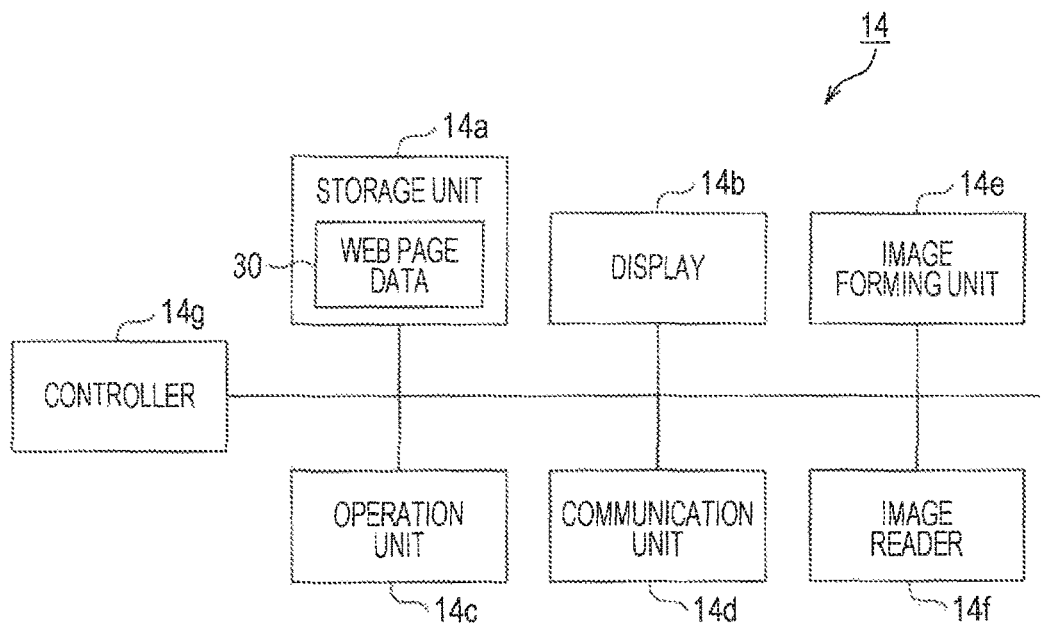
FIG. 3 is a schematic block diagram of a child multifunction device according to the exemplary embodiment.

FIG. 3 is a schematic block diagram of a child multifunction device 14. The child multifunction device 14 in this exemplary embodiment has multiple functions such as printing, scanning, copying, and fax sending and receiving functions. The schematic configurations of the plural child multifunction devices 14 are substantially the same, but the capabilities of each function (for example, whether a child multifunction device 14 is capable of performing duplex printing or color printing) may be different among the plural child multifunction devices 14.

The child multifunction device 14 may also function as a web server. For example, a user may start a web browser operated on the mobile terminal 12 and access the child multifunction device 14 by using HyperText Transfer Protocol (HTTP). Then, the child multifunction device 14 can provide a HyperText Markup Language (HTML) file or an image file to the mobile terminal 12.

A storage unit 14a is constituted by a ROM, a RAM, and a hard disk. In the storage unit 14a, a program for operating the individual elements of the child multifunction device 14 and processing results in the child multifunction device 14 are stored. In the storage unit 14a, web page data 30 constituted by HTML files and image files is also stored. The web page data 30 is used when the child multifunction device 14 functions as a web server.

A display 14b is constituted by a liquid crystal display panel, for example. The display 14b displays various screens showing the content of processing that is being executed by the child multifunction device 14 or a list of jobs to be processed by the child multifunction device 14.

An operation unit 14c includes a touch panel and buttons, for example. The operation unit 14c is used by a local user to input an instruction into the child multifunction device 14. The local user is a user physically operating the operation unit 14c, in this case.

A communication unit 14d is constituted by a LAN module, for example, and is used for communicating with other devices via the communication network 18. The child multifunction device 14 sends and receives various items of information (data) with the mobile terminal 12 and the parent multifunction device 16 via the communication unit 14d. That is, the communication unit 14d serves as an information sender and an information receiver in the child multifunction device 14.

The communication unit 14d sends information concerning the operating state of the child multifunction device 14 to the parent multifunction device 16. For example, if the communication unit 14d is in a busy state when receiving a job input by a local user, the communication unit 14d sends information indicating that the child multifunction device 14 is "busy" to the parent multifunction device 16. If all reserved jobs have been executed in the child multifunction device 14, the communication unit 14d sends information indicating that the child multifunction device 14 is "free" to the parent multifunction device 16.

The communication unit 14d also has a fax sending function. The communication unit 14d can send a digital file by using this function.

An image forming unit 14e includes a raster image processing (RIP) processor and an output unit. The RIP processor converts image data specified by a print job into raster data. The output unit performs print processing for reproducing the converted raster data or image data obtained by reading an image by an image reader 14f (discussed later) on a print medium, such as paper. That is, the image forming unit 14e implements a printing function or a copying function.

The image reader 14f is constituted by an image reading device, and reads an image on a print medium, such as paper, to generate image data. The image reader 14f implements a scanning function or a copying function.

As described above, the communication unit 14d, the image forming unit 14e, and the image reader 14f serve as an execution unit that executes processing corresponding to job reservation information.

A controller 14g is constituted by a microcomputer or a central processing unit (CPU), for example, and controls the individual elements of the child multifunction device 14 in accordance with a program stored in the storage unit 14a.

Figure 4:
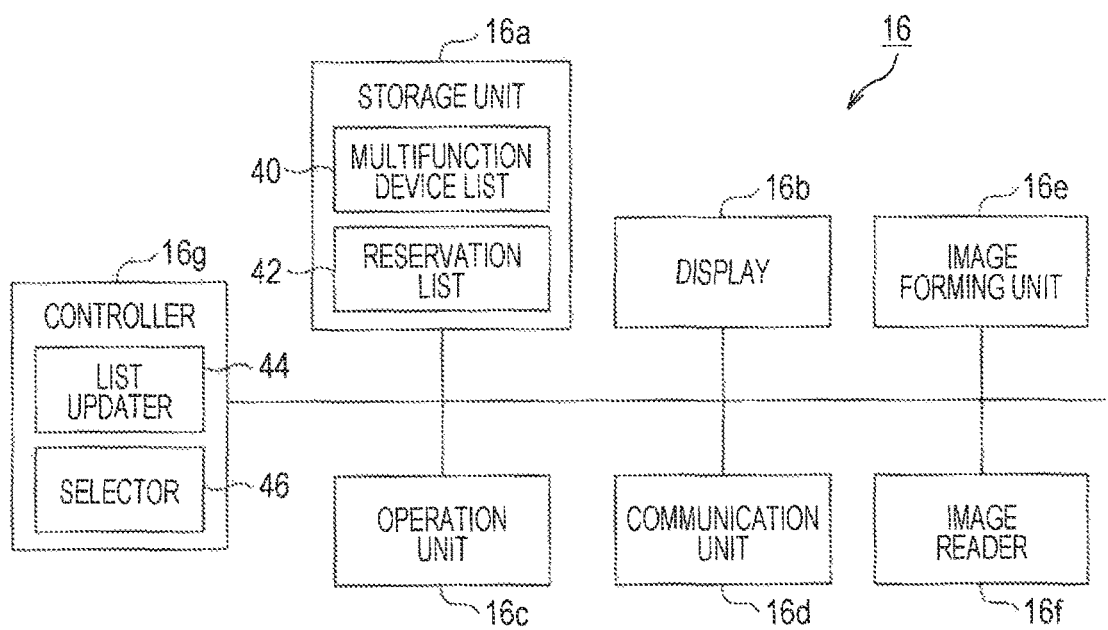
FIG. 4 is a schematic block diagram of a parent multifunction device according to the exemplary embodiment.

FIG. 4 is a schematic block diagram of the parent multifunction device 16. The hardware configuration of the parent multifunction device 16 is similar to that of the child multifunction device 14, and a detailed explanation of the individual elements will thus be omitted. However, the parent multifunction device 16 serves as a management device, and thus, data stored in a storage unit 16a and functions implemented by a controller 16g are different from those of the child multifunction device 14. Portions different from the child multifunction device 14 will be explained below.

In the storage unit 16a, a multifunction device list 40 indicating plural child multifunction devices 14 managed by the parent multifunction device 16 is stored. The multifunction device list 40 is stored in the storage unit 16a in advance by the administrator of the job management system 10, for example. This means that the administrator sets child multifunction devices 14 managed by the parent multifunction device 16, for example, child multifunction devices 14 installed on the same floor as the parent multifunction device 16.

Figure 5:
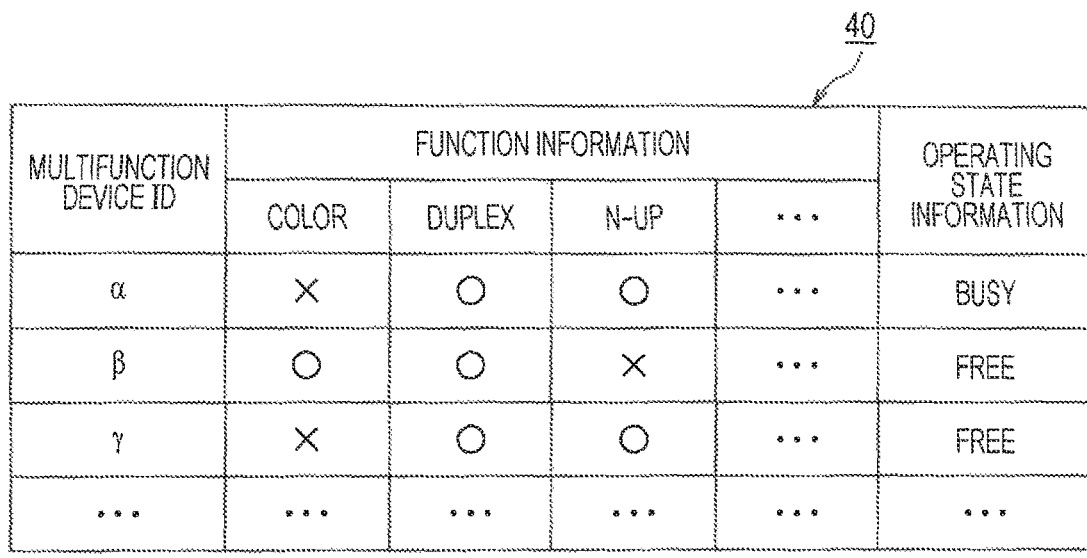
FIG. 5 is a table illustrating an example of a multifunction device list.

FIG. 5 shows an example of the multifunction device list 40. In the multifunction device list 40, a multifunction device ID for identifying a multifunction device, function information indicating functions of a multifunction device, operating state information indicating the operating state of a multifunction device are associated with each other. In this exemplary embodiment, the multifunction device list 40 is represented in a table format. For example, the topmost record indicates that a child multifunction device α is not capable of performing color printing but is capable of performing duplex printing and N-up printing and is currently busy. In FIG. 5, three functions such as color printing, duplex printing, and N-up printing are indicated as the function information. However, the function information may also indicate other functions. The operating state information is updated dynamically by a list updater 44, which will be discussed later.

In the storage unit 16a, a reservation list 42 of child multifunction devices 14 that will execute processing operations corresponding to job reservations is stored. More specifically, the reservation list 42 indicates child multifunction devices 14 that are assigned to execute jobs indicated by items of job reservation information sequentially received from one or plural mobile terminals 12 by the parent multifunction device 16.

Figure 6:
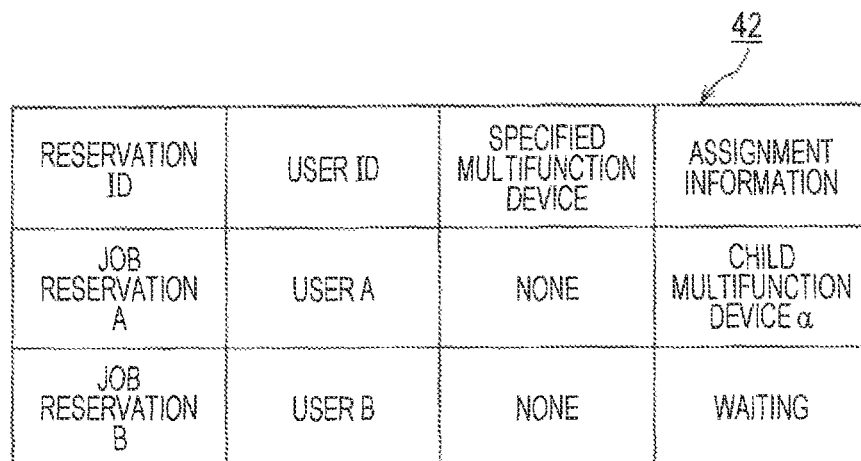
FIG. 6 is a table illustrating an example of a reservation list.

FIG. 6 shows an example of the reservation list 42. In the reservation list 42, a reservation ID for identifying a job reservation, a user ID for identifying a user sent a job reservation, specifying information included in job reservation information, assignment information indicating a child multifunction device 14 to which a job reservation is assigned are associated with each other. In this exemplary embodiment, the reservation list 42 is also represented in a table format. For example, the topmost record indicates that a job reservation A sent by a user A does not have any child multifunction device specified by the user A and is assigned to a child multifunction device α. The content of the reservation list 42 is updated dynamically by the list updater 44.

The controller 16g of the parent multifunction device 16 also functions as the list updater 44 and a selector 46.

The list updater 44 updates the reservation list 42 and the operating state information included in the multifunction device list 40. The list updater 44 updates the operating state information in accordance with the operating states of the individual child multifunction devices 14 sent from the child multifunction devices 14. The list updater 44 also updates the reservation list 42 in accordance with job reservation information sent from the mobile terminal 12.

The selector 46 selects, from among plural child multifunction devices 14, a child multifunction device 14, which serves as a subject image processing device, to which a job reservation indicated by job reservation information sent from the mobile terminal 12 is assigned. More specifically, the selector 46 searches the operating state information in the multifunction device list 40 for a "free" child multifunction device 14 and then assigns a job reservation to this child multifunction device 14.

Figure 7:
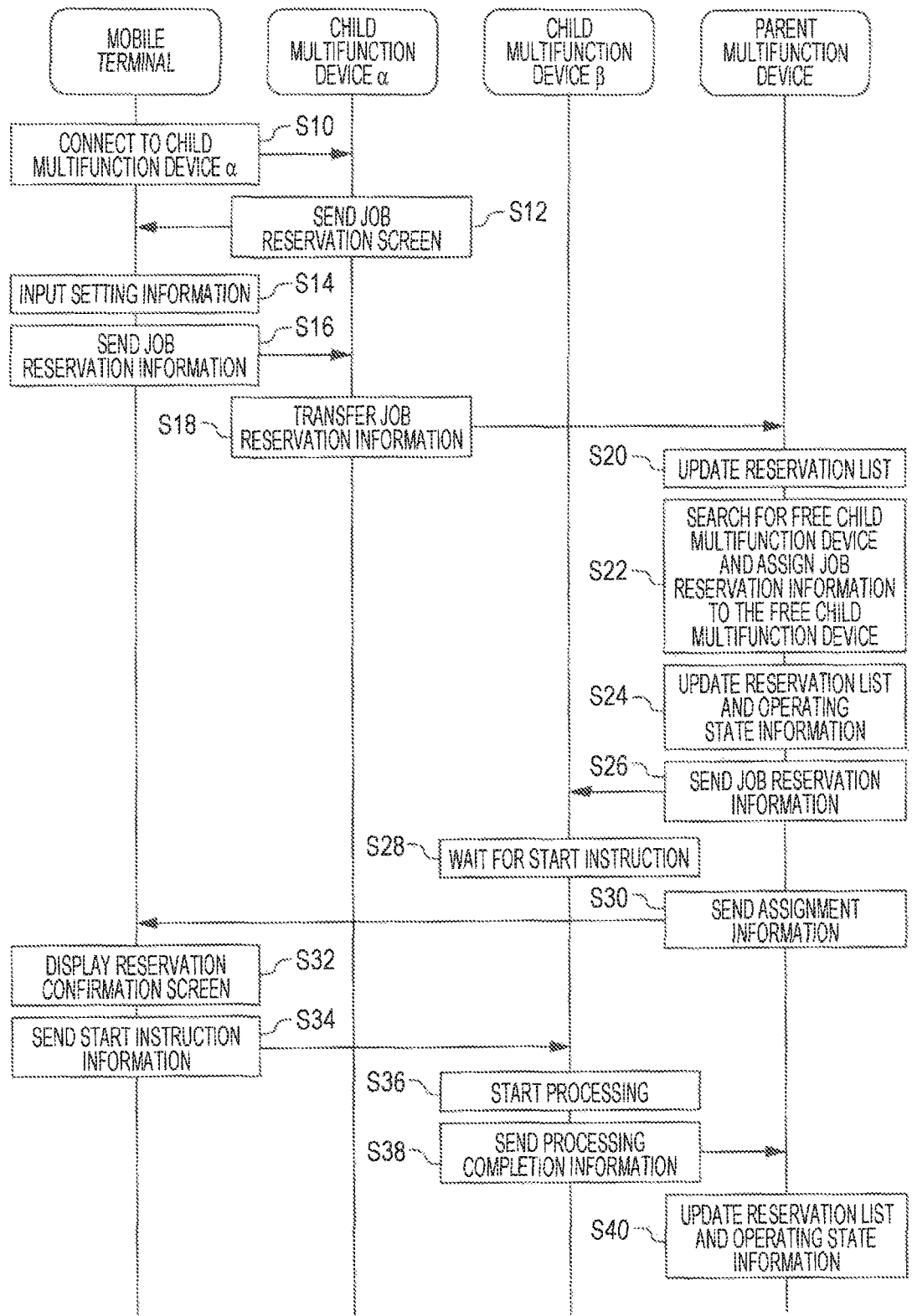
FIG. 7 is a flowchart illustrating a processing operation executed by the job management system according to the exemplary embodiment.

Details of processing executed by the job management system 10 will be described below according to the flowchart of FIG. 7.

In step S10, a user starts a web browser on the mobile terminal 12 and accesses a child multifunction device α among the plural child multifunction devices 14 by using HTTP.

Upon receiving access from the mobile terminal 12, in step S12, the child multifunction device α sends the web page data 30 to the mobile terminal 12. In this case, the child multifunction device α sends a job reservation screen for instructing a user to make a job reservation.

In step S14, the user inputs the content and the settings of a job to be processed by a child multifunction device 14 into the job reservation screen received from the child multifunction device α.

FIG. 8A shows an example of the job reservation screen. The job reservation screen shown in FIG. 8A is a screen for making a print job reservation to instruct a child multifunction device 14 to perform printing. On the job reservation screen, the user can input data to be printed, which is a digital file, a child multifunction device 14 that processes this data, and settings of a print job, such as the number of print copies and print size. When the user presses a detailed settings button 50 provided at the bottom of the job reservation screen, the screen shown in FIG. 8B is displayed. Then, the user can set detailed settings of the print job, such as the orientation of an image, color mode, whether to perform duplex printing, and whether to perform N-up printing.

After finishing setting the settings of a job, the user presses a job reservation button 52. Then, in step S16, the communication unit 12d, which serves as a first processing request information sender, sends job reservation information to the child multifunction device α. The job reservation information includes a reservation ID for identifying a job reservation, a user ID for identifying the user inputted this job reservation, a mobile terminal ID for identifying the mobile terminal input this job reservation, specifying information for specifying one or plural child multifunction devices 14 that will process this job reservation, and setting information indicating the settings of the job.

In step S18, the child multifunction device α transfers the job reservation information received from the mobile terminal 12 to the parent multifunction device 16.

Figure 9A:
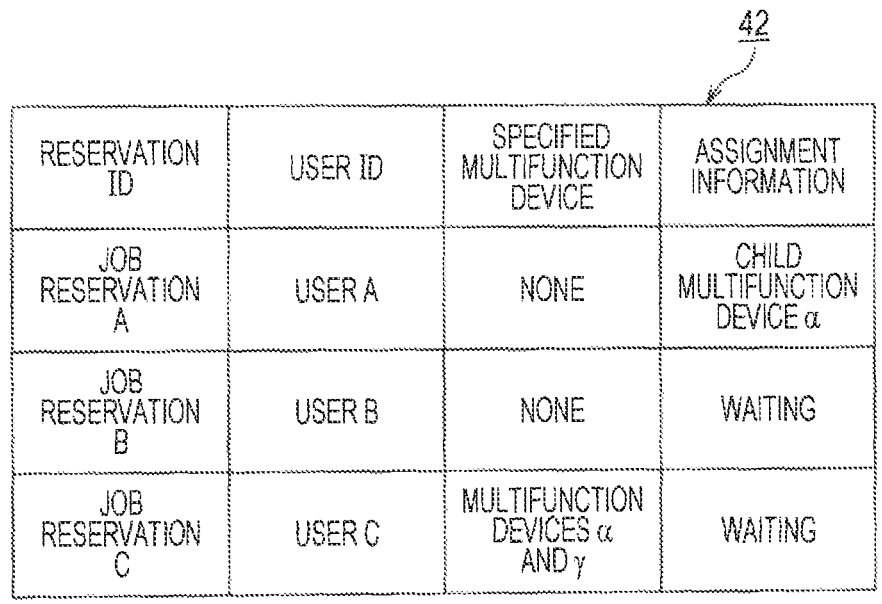
FIGS. 9A and 9B respectively illustrate a first state of the reservation list and the multifunction device list.
Figure 9B:
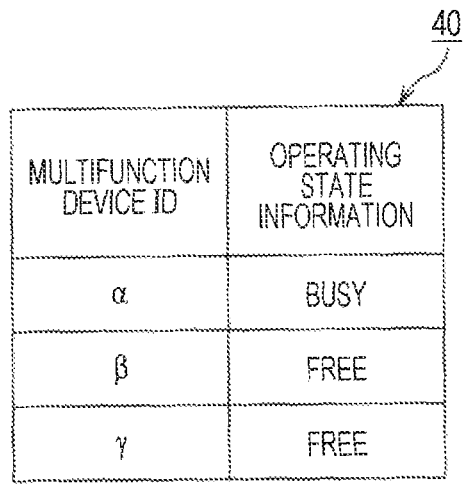
Figure 10A:
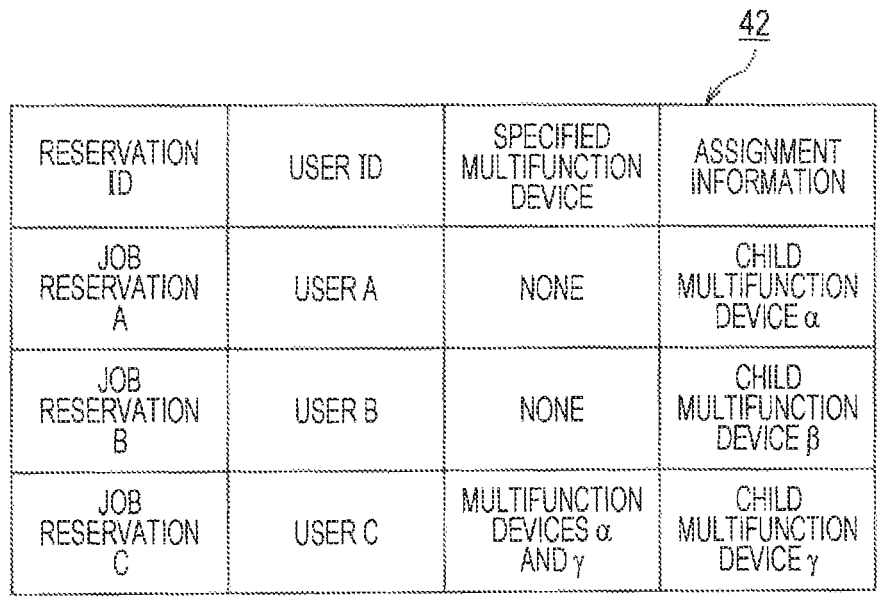
FIGS. 10A and 10B respectively illustrate a second state of the reservation list and the multifunction device list.
Figure 10B:
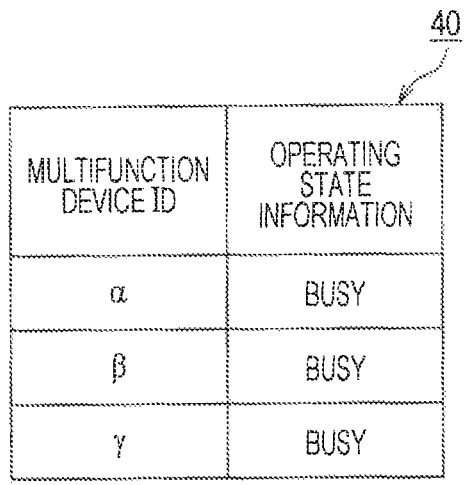
Figure 13A:
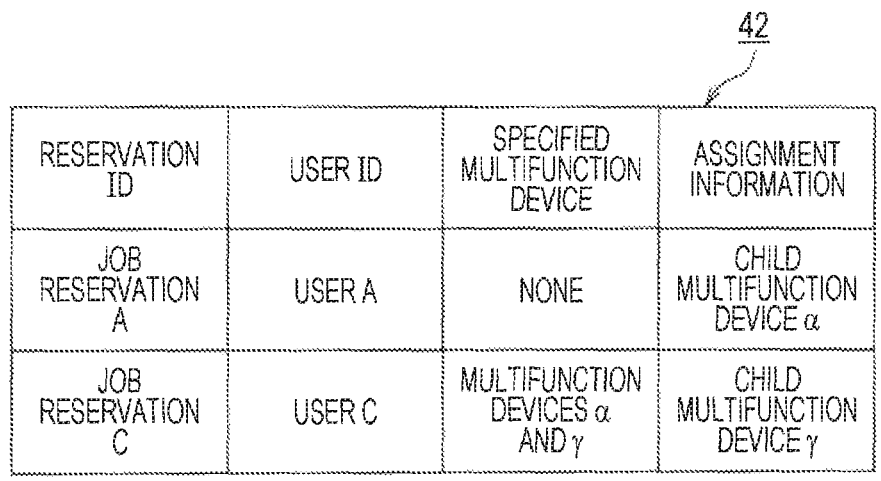
FIGS. 13A and 13B respectively illustrate a third state of the reservation list and the multifunction device list.
Figure 13B:
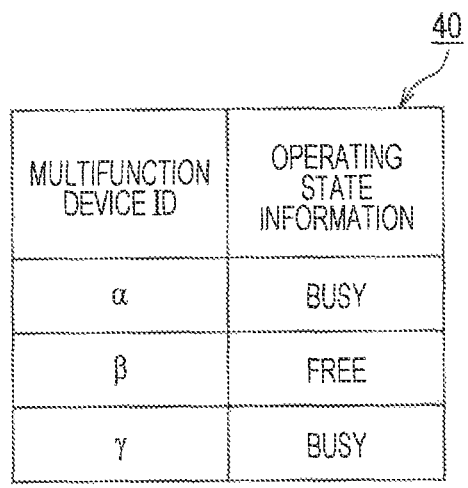

Upon receiving the job reservation information from the child multifunction device α by the parent multifunction device 16, in step S20, the list updater 44 updates the reservation list 42, based on the received job reservation information. The state of the reservation list 42 after step S20 is shown in FIG. 9A. It is now assumed that the job reservation A from the user A has been made, and then, job reservation information from a user B and job reservation information from a user C are sequentially received. The list updater 44 adds new records to the reservation list 42 based on the reservation IDs, user IDs, and specifying information included in the received items of job reservation information. When the parent multifunction device 16 receives the items of job reservation information from the users B and C, the assignment information concerning these job reservations indicate "waiting", which means that these job reservations are waiting to be assigned (assignment waiting). In this example, the operating states of the child multifunction devices 14 at the time point of step S20 are those shown in FIG. 9B. That is, the child multifunction device α is "busy", while child multifunction devices β and γ are "free". The child multifunction devices shown in FIGS. 9B, 10B, and 13B are some of the child multifunction devices in the multifunction device list 40.

In step S22, the selector 46 refers to the multifunction device list 40 (in particular, the operating state information) and searches for a "free" child multifunction device 14 from among the child multifunction devices 14 managed by the parent multifunction device 16 so that a job reservation waiting to be assigned (hereinafter called "unassigned job reservation") can be assigned to the "free" child multifunction device 14. Then, the selector 46 associates (assigns) an unassigned job reservation to a "free" child multifunction device 14.

Based on the setting information concerning the unassigned job reservation, the selector 46 selects, from among the child multifunction devices 14 in the multifunction device list 40, child multifunction devices 14 that are capable of executing processing indicated by this unassigned job reservation, and then searches for a "free" child multifunction device 14 from among the selected child multifunction devices 14. For example, if the multifunction device list 40 is the list shown in FIG. 5 and if the processing indicated by the unassigned job reservation is N-up printing, the selector 46 searches for a "free" child multifunction device 14 from among the child multifunction devices α, γ, . . . that are capable of performing N-up printing.

If specifying information corresponding to an unassigned job reservation indicates that plural child multifunction devices 14 are specified, the selector 46 searches for a "free" child multifunction device from among the child multifunction devices 14 specified by the specifying information. Alternatively, an unassigned job reservation may be assigned to a child multifunction device 14 in the following manner. Information concerning a child multifunction device 14 (in this case, the child multifunction device α) that has first received job reservation information from the mobile terminal 12 may be included in the job reservation information. Then, based on this information, the unassigned job reservation may be assigned preferentially to this child multifunction device 14. This is based on the assumption that, if the user of the mobile terminal 12 wants a certain child multifunction device 14 to execute processing, the user usually sends the job reservation information to this child multifunction device 14 first.

If the reservation list 42 has plural unassigned job reservations, as shown in FIG. 9A, the selector 46 may associate a child multifunction device 14 to an unassigned job that has been received earlier (such a job will be called "a preceding unassigned job"), based on specifying information concerning an unassigned job that has been received later (such a job will be called "a subsequent unassigned job"). The following case is now considered, for example. As shown in FIG. 9B, the child multifunction devices β and γ are free, and as shown in FIG. 9A, a job reservation B without any specified child multifunction device has been received first as the preceding unassigned job and a job reservation C including specifying information for specifying the child multifunction devices α and γ has been received later as the subsequent unassigned job. In this case, if the job reservation B is assigned to the child multifunction device γ, processing corresponding to the job reservation C will not start until processing corresponding to the job reservation A or B has been completed. The selector 46 thus assigns the job reservation B to the child multifunction device β which is free and which is not specified by the specifying information corresponding to the job reservation C. In this manner, the job reservation B can be assigned to the child multifunction device β and the job reservation C can be assigned to the child multifunction device γ as specified, so that the child multifunction devices β and γ may start processing corresponding to the job reservations B and C at the same time. That is, the time before starting processing corresponding to the job reservations B and C is reduced.

If there are plural subsequent unassigned job reservations, the selector 46 performs job assignment to child multifunction devices 14 so that the preceding unassigned job reservation and the first (earlier) subsequent unassigned job reservations will not be assigned to the same child multifunction device. For example, it is now assumed that the preceding unassigned job reservation specifies the child multifunction devices α and β, the first subsequent unassigned job reservation specifies the child multifunction device α, and the second subsequent unassigned job reservation specifies the child multifunction device β. In this case, the preceding unassigned job reservation is assigned to the child multifunction device β, and the first subsequent unassigned job reservation is assigned to the child multifunction device α.

If there is no "free" child multifunction device 14 when the selector 46 receives job reservation information, the selector 46 does not execute the above-described job assignment and waits until one of the child multifunction devices 14 becomes free.

After unassigned job reservations are assigned to child multifunction devices as described above, in step S24, the list updater 44 updates the assignment information in the reservation list 42. The updated reservation list 42 is shown in FIG. 10A. The list updater 44 also updates the operating state information in the multifunction device list 40. More specifically, as shown in FIG. 10B, the operating state information concerning the assigned child multifunction devices (the child multifunction devices β and γ in the example in FIG. 10B) is changed from "free" to "busy".

In step S26, the communication unit 16*d*, which serves as a second processing request information sender, sends the job reservation information to a child multifunction device 14 to which the job reservation is assigned. Then, the processing corresponding to this job reservation is reserved in this child multifunction device 14. In this example, the communication unit 16*d* sends the job reservation information concerning the job reservation B (hereinafter called "job reservation information B") to the child multifunction device β, and sends the job reservation information concerning the job reservation C to the child multifunction device γ. The job reservation information that has been sent to a child multifunction device 14 remains stored in the storage unit 16*a* of the parent multifunction device 16 until processing corresponding to this job reservation information has been completed or canceled. The cancellation of a job reservation will be discussed later. Processing to be executed by the child multifunction device β to which the job reservation B is assigned will be discussed below by way of example.

In step S28, upon receiving the job reservation information B, the child multifunction device β waits for receiving a start instruction from the mobile terminal 12. Alternatively, the child multifunction device β may start processing immediately after receiving the job reservation information B.

In step S30, the communication device 16d sends assignment information indicating the child multifunction device 14 (child multifunction device β) to which the job reservation B is assigned to the mobile terminal 12 used by the user B. The communication device 16d can identify the mobile terminal 12 used by the user B, based on the mobile terminal ID indicated by the job reservation information B.

Figure 11:
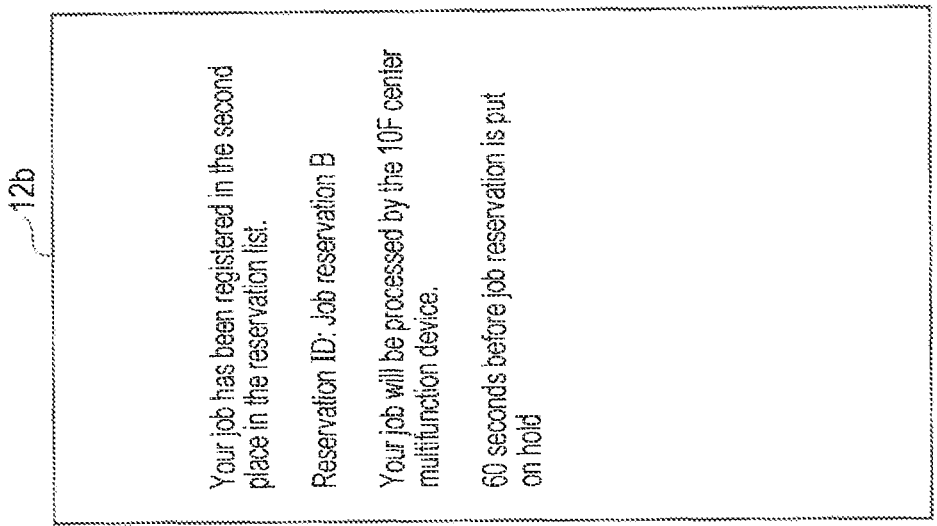
FIG. 11 illustrates an example of a reservation confirmation screen.

In step S32, a reservation confirmation screen is displayed on the display 12b of the mobile terminal 12. FIG. 11 shows an example of the reservation confirmation screen. On the reservation confirmation screen, information concerning the registration position of the job reservation input by the user in the reservation list 42, the reservation ID for identifying the job reservation, information concerning the assigned child multifunction device 14, and the time before the job reservation is put on hold, which will be discussed later, are displayed. As the information concerning the assigned child multifunction device 14, the name, the number, an image, or an icon set by the user of the mobile terminal 12 for the assigned child multifunction device 14 may be displayed. The reservation confirmation screen enables the user B to recognize to which child multifunction device the job reservation input by the user B is assigned.

Figure 12:
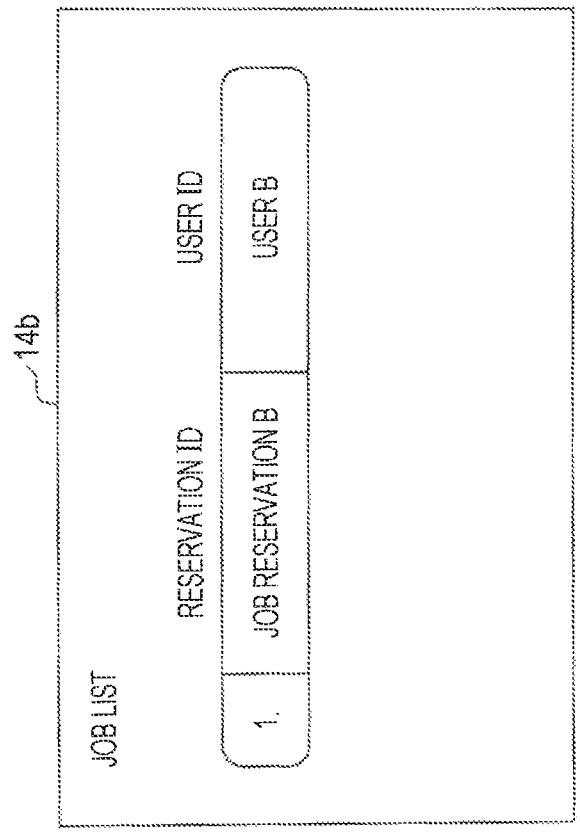
FIG. 12 illustrates an example of a reservation job list displayed on the screen of a child multifunction device.

When the parent multifunction device 16 sends the job reservation information B to the child multifunction device β in step S26, a job list of job reservations assigned to the child multifunction device β is displayed on the display 14b of the child multifunction device β. FIG. 12 shows an example of the job list. In the job list, the reservation ID and the user ID are indicated. The user B can check that the job reservation B is assigned to the child multifunction device β. In terms of the security, as the user ID, a nickname set by the user B, for example, may be displayed on the display 14b of the child multifunction device β.

In step S34, by using the mobile terminal 12, the user B accesses the child multifunction device β to which the job reservation B is assigned. Then, the communication unit 12d, which serves as a start instruction information sender, sends start instruction information for instructing the child multifunction device β to start processing corresponding to the job reservation B to the child multifunction device β. The user usually needs to obtain processing results (such as a printed material). The user thus basically goes to the location of the child multifunction device 14 to which the job reservation is assigned and then sends start instruction information.

Upon receiving the start instruction information, in step S36, the child multifunction device β starts processing corresponding to the job reservation B. The child multifunction device β also sends information indicating that the start instruction information has been received from the mobile terminal 12 to the parent multifunction device 16. Upon completion of the processing, in step S38, the child multifunction device β sends processing completion information indicating that the processing corresponding to the job reservation B has been completed to the parent multifunction device 16.

In step S40, upon receiving the processing completion information by the parent multifunction device 16, the list updater 44 updates the operating state information in the multifunction device list 40 and the reservation list 42, based on the processing completion information. More specifically, the list updater 44 changes the operating state of the child multifunction device β to "free" and deletes the job reservation B from the reservation list 42. FIG. 13A shows the reservation list 42 after step S40, and FIG. 13B shows the multifunction device list 40 after step S40.

In this exemplary embodiment, the child multifunction device β sends the processing completion information to the parent multifunction device 16 after completing the processing corresponding to the job reservation B. However, before completing the processing, the child multifunction device β may calculate the time when the processing will be completed, and may send preliminary completion information to the parent multifunction device 16 prior to the calculated time (slightly before the calculated time). The parent multifunction device 16 receives the preliminary completion information and understands that the child multifunction device β will soon become free. Thus, upon receiving the preliminary completion information, the parent multifunction device 16 assigns an unassigned job reservation to the child multifunction device β, and sends assignment information to another user (mobile terminal 12) inputted this unassigned job reservation before the processing corresponding to the previous job reservation (that is, the job reservation B) is completed in the child multifunction device β. With this configuration, when a user reserves a print job and needs to fetch a printed material at the child multifunction device β after processing, particularly when the user is far away from the child multifunction device β, the user can leave earlier.

As described above, in the job management system 10, job reservations input by users are first collected in the parent multifunction device 16. Then, the parent multifunction device 16 assigns job reservations to "free" child multifunction devices 14 according to the operating states of the plural child multifunction devices 14, and instructs the assigned child multifunction devices 14 to execute processing operations corresponding to the job reservations. It is thus possible to start processing corresponding to a job reservation earlier than when a user specifies a child multifunction device to execute processing, particularly when another job is already reserved in this specified child multifunction device.

Figure 14:
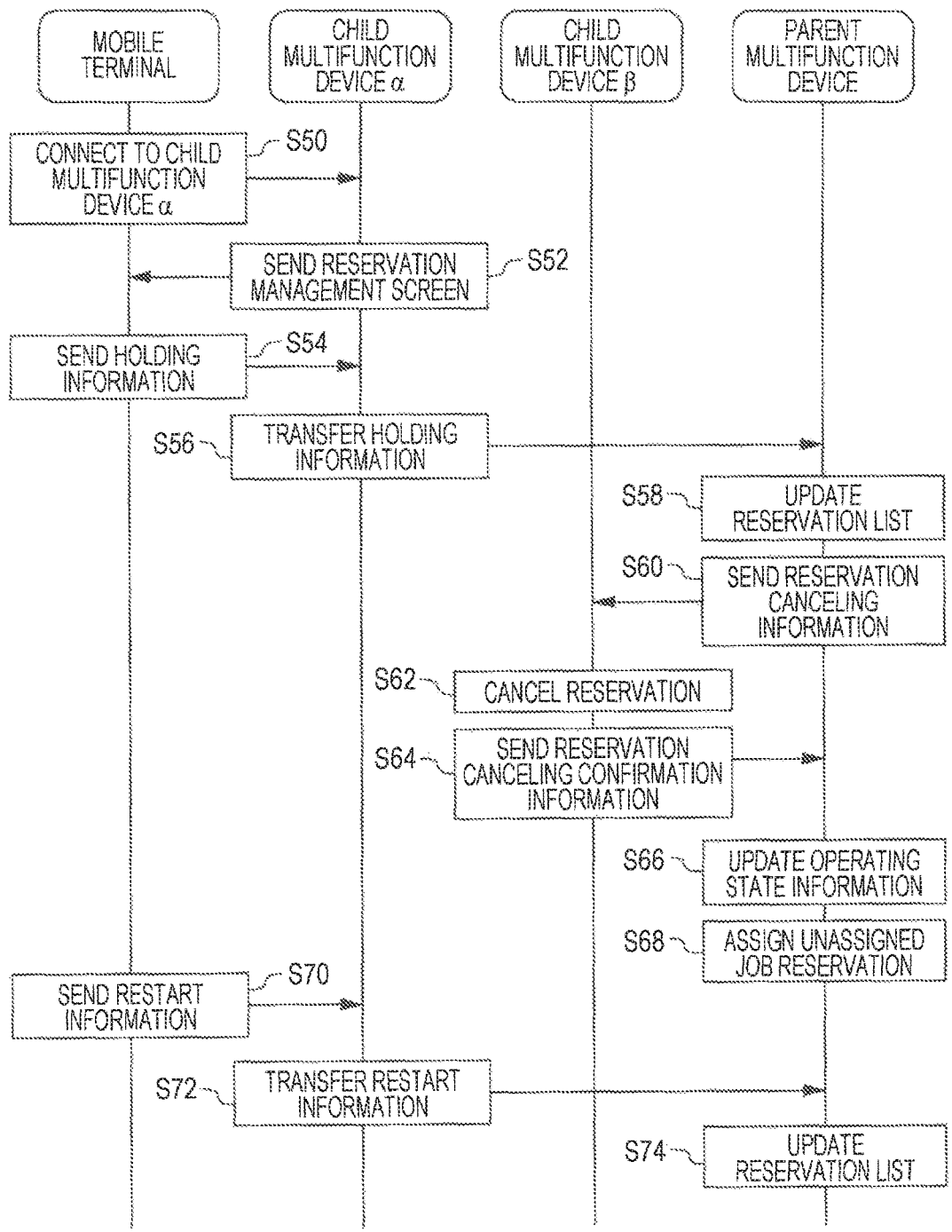
FIG. 14 is a flowchart illustrating another processing operation executed by the job management system according to the exemplary embodiment.

An operation to be executed when processing corresponding to a job reservation is put on hold by a user will be described below with reference to the flowchart of FIG. 14. The operation in the flowchart in FIG. 14 starts when the mobile terminal 12 has sent job reservation information B to the parent multifunction device 16 via the child multifunction device α and the selector 46 has assigned the job reservation B to the child multifunction device β.

In step S50, the user B starts a web browser on the mobile terminal 12 and accesses the child multifunction device α, which is one of the plural child multifunction devices 14, by using HTTP.

Upon receiving access from the mobile terminal 12, in step S52, the child multifunction device α sends the web page data 30 to the mobile terminal 12. In this case, the child multifunction device α sends a reservation management screen for allowing the user to manage reserved job reservation information.

Figure 15:
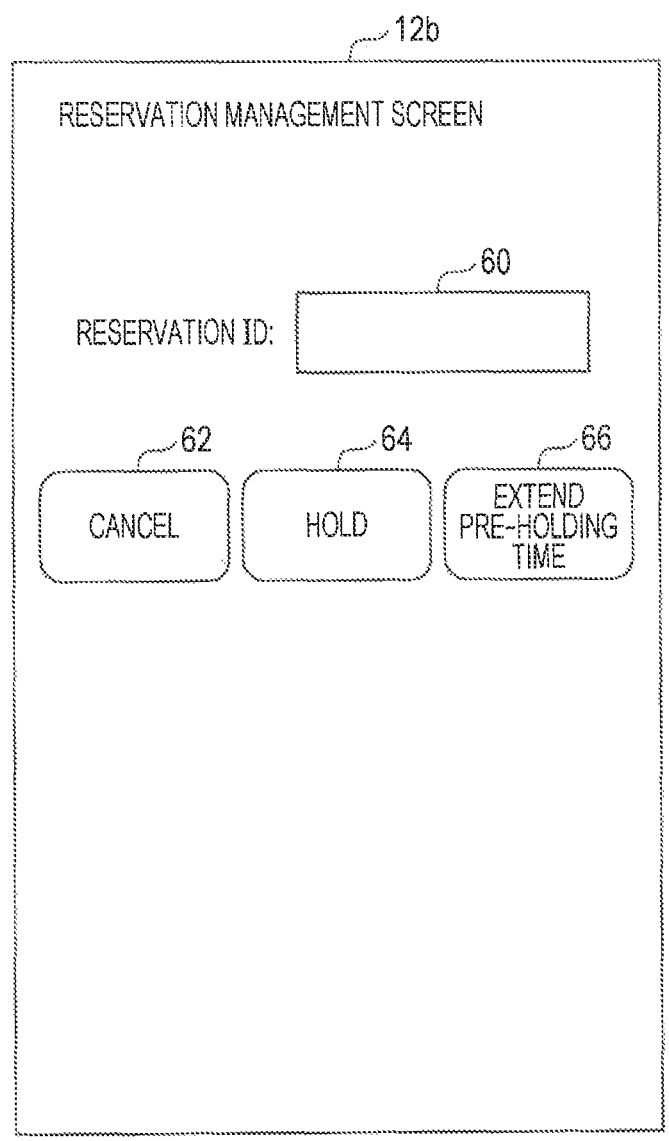
FIG. 15 illustrates an example of a reservation management screen.

FIG. 15 shows an example of the reservation management screen. The reservation management screen includes a reservation ID input field 60 for inputting a reservation ID of a reserved job, a cancel button 62, a hold button 64, and a pre-holding time extend button 66. For example, if the user B inputs the reservation ID of a reserved job reservation B into the reservation ID input field 60 and presses the cancel button 62, information indicating a canceling instruction is sent to the parent multifunction device 16 via the child multifunction device α. Upon receiving this information by the parent multifunction device 16, the list updater 44 deletes the job reservation B from the reservation list 42 so as to cancel the job reservation B.

In this example, it is assumed that the user B inputs the reservation ID of the reserved job reservation B into the reservation ID input field 60 and presses the hold button 64. The pre-holding time extend button 66 will be discussed later.

When the hold button 64 is pressed, in step S54, the communication unit 12d, which serves as a holding information sender, sends holding information for holding processing corresponding to the reserved job reservation to the child multifunction device α. The holding information includes a reservation ID for identifying a job reservation (job reservation B in this example) input into the reservation ID input field 60.

In step S56, the child multifunction device α receives the holding information from the mobile terminal 12 and transfers it to the parent multifunction device 16. In this example, the holding information is sent to the parent multifunction device 16 via the child multifunction device α. However, the holding information may be sent directly to the parent multifunction device 16.

Figure 16A:
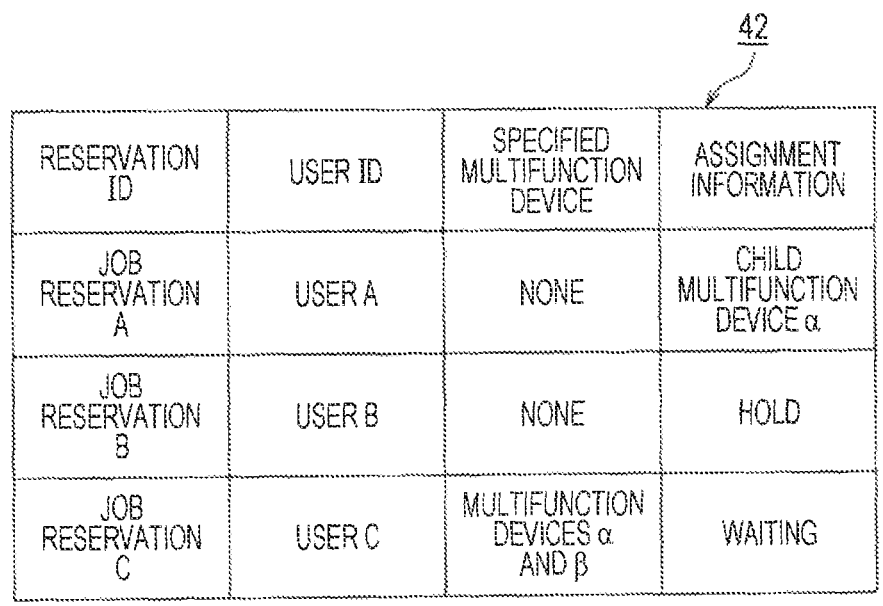
FIGS. 16A and 16B respectively illustrate a fourth state of the reservation list and the multifunction device list.
Figure 16B:
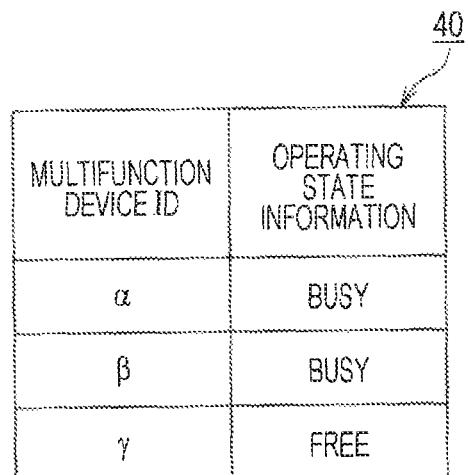
Figure 17A:
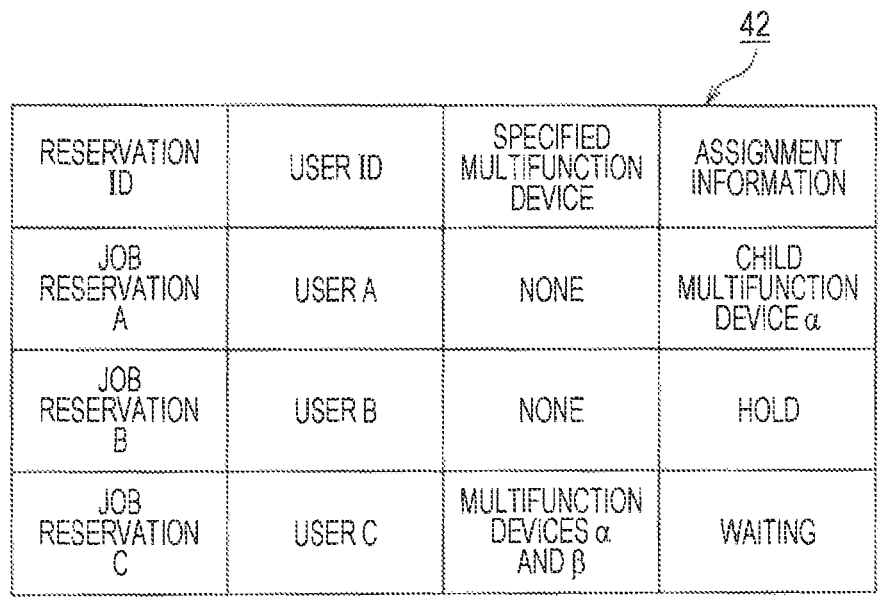
FIGS. 17A and 17B respectively illustrate a fifth state of the reservation list and the multifunction device list.
Figure 17B:
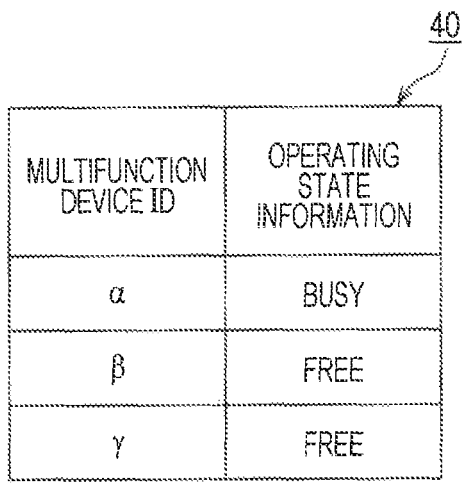
Figure 18A:
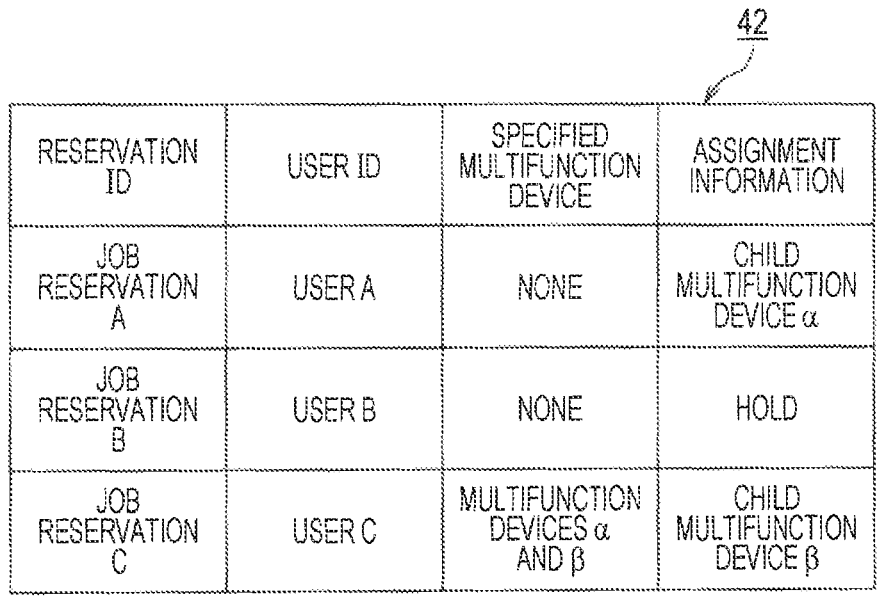
FIGS. 18A and 18B respectively illustrate a sixth state of the reservation list and the multifunction device list.
Figure 18B:
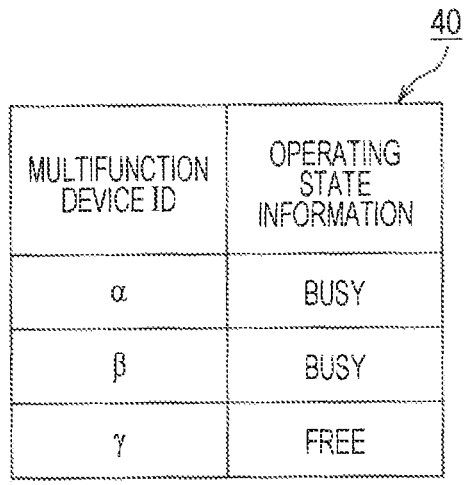

Upon receiving the holding information from the child multifunction device α by the parent multifunction device 16, in step S58, the list updater 44 updates the reservation list 42 based on the received holding information. FIG. 16A shows the state of the reservation list 42 after step S58. As shown in FIG. 16A, the list updater 44 specifies the job reservation B from the reservation list 42, based on the reservation ID indicated by the holding information, and changes the assignment information related to the job reservation B from "child multifunction device β" to "hold". FIG. 16B shows the state of the multifunction device list 40 after step S58. As shown in FIG. 16B, the state of the child multifunction device β remains "busy" after step S58. The child multifunction devices shown in FIGS. 16B, 17B, and 18B are some of the child multifunction devices in the multifunction device list 40.

In step S60, the communication unit 16d, which serves as a holding processing execution unit, cancels processing corresponding to the job reservation B, based on the received holding information. That is, the communication unit 16d sends reservation canceling information, which serves as processing stop information, for canceling the reservation for processing corresponding to the job reservation B, to the child multifunction device β. After the communication unit 16d has sent the reservation canceling information, the job reservation information B remains stored in the storage unit 16a of the parent multifunction device 16. This eliminates the need for the user to input setting information to be included in the job reservation information B all over again when the user cancels the holding of the job reservation B, that is, when the user restarts processing corresponding to the job reservation B.

In step S62, the child multifunction device β cancels the reservation for processing corresponding to the job reservation B, based on the reservation canceling information received from the parent multifunction device 16. Upon completion of the reservation canceling processing, in step S64, the child multifunction device β sends reservation canceling confirmation information that the canceling for the job reservation B has been completed to the parent multifunction device 16.

In step S66, the list updater 44 updates the operating state information in the multifunction device list 40, based on the received reservation canceling confirmation information. FIGS. 17A and 17B respectively show the states of the reservation list 42 and the multifunction device list 40 after step S66. As shown in FIG. 17B, the list updater 44 changes the operating state information concerning the child multifunction device β from "busy" to "free", based on the reservation canceling confirmation information received from the child multifunction device β. Then, the selector 46 can assign an unassigned job reservation to the child multifunction device β.

In step S68, the selector 46 assigns an unassigned job reservation included in the reservation list 42 to a child multifunction device 14. In this example, as shown in FIG. 17A, an unassigned job reservation C, which specifies the child multifunction device β, is included in the reservation list 42. The unassigned job reservation C is assigned to the child multifunction device β. Then, the list updater 44 updates the reservation list 42 and the operating state information in the multifunction device list 40, as shown in FIGS. 18A and 18B. More specifically, as shown in FIG. 18A, the list updater 44 changes the assignment information concerning the job reservation C from "waiting" to "child multifunction device β", and changes the operating state information concerning the child multifunction device β from "free" to "busy", as shown in FIG. 18B.

Steps S70 through S74 are executed for restarting a job reservation put on hold as described above. In step S70, the user B accesses the child multifunction device α by using the mobile terminal 12 and sends restart information including a reservation ID to the child multifunction device α.

In step S72, the child multifunction device α transfers the restart information received from the mobile terminal 12 to the parent multifunction device 16. In this example, the restart information is sent to the parent multifunction device 16 via the child multifunction device α. However, the restart information may be sent directly to the parent multifunction device 16.

Upon receiving the restart information from the child multifunction device α by the parent multifunction device 16, in step S74, the list updater 44 updates the reservation list 42 based on the received restart information. More specifically the list updater 44 changes the assignment information concerning the job reservation B from "hold" to "waiting". Then, steps similar to steps S22 through S40 in FIG. 7 are executed. If the assignment information in the reservation list 42 indicates that plural job reservations are "waiting", the position of the job reservation for which the assignment information has been changed from "hold" to "waiting" may be maintained. Alternatively, the job reservation for which the assignment information has been changed from "hold" to "waiting" may shift to the end of the reservation list 42. Alternatively, if the job reservation is put on hold by the user and is then restarted, the position of the job reservation in the reservation list 42 may be maintained. If the job reservation is put on hold due to the lapse of a pre-holding time, which will be discussed later, and is then restarted, the position of the job reservation in the reservation list 42 may shift to the end of the reservation list 42.

A situation where a job reservation is not processed and left as it is because a start instruction is not received will now be considered. There may be situation where a pre-holding time (period before a job reservation is put on hold) set by the administrator elapses during the period from when the selector 46 assigns a job reservation to a child multifunction device 14 until when the mobile terminal 12 sends start instruction information to the child multifunction device 14 (until when the child multifunction device 14 sends information indicating that the start instruction information has been received from the mobile terminal 12 to the parent multifunction device 16). In this case, the parent multifunction device 16 may put this job reservation on hold. In this exemplary embodiment, the start point of the pre-holding time is set to be the time point when the selector 46 assigns a job reservation to a child multifunction device 14. However, the start point of the pre-holding time may be a time point based on the time point when the selector 46 assigns a job reservation to a child multifunction device 14, for example, a time point at which assignment information is sent to the mobile terminal 12.

The time before the job reservation is put on hold is preferably displayed on the reservation confirmation screen displayed on the mobile terminal 12 after the job reservation has been assigned to the child multifunction device 14 (see FIG. 11).

There may be a situation where the user is unable to send start instruction information before the predetermined pre-holding time elapses although the user intends to do so because, for example, the user is at a location far away from a child multifunction device 14 to which a job reservation is assigned. To address such a situation, the pre-holding time extend button 66 is provided on the reservation management screen (see FIG. 15). If the user inputs a job reservation ID into the reservation ID input field 60 and then presses the pre-holding time extend button 66, the communication unit 12*d*, which serves as a pre-holding time extend information sender, sends pre-holding time extend information to the parent multifunction device 16 via the child multifunction device α. Then, the pre-holding time is extended for a predetermined time (for example, sixty seconds).

If it is detected that the user (mobile terminal 12) inputted a job reservation is approaching the child multifunction device 14 to which the job reservation is assigned, pre-holding time extend information may be automatically sent from the mobile terminal 12 to the parent multifunction device 16. The child multifunction device 14 may be able to detect the presence of the mobile terminal 12 by using a Bluetooth (registered trademark) transmitter. For example, a Bluetooth transmitter which continuously transmits a unique ID of the child multifunction device 14 is provided in the child multifunction device 14, and when the mobile terminal 12 receives this unique ID by Bluetooth communication, it is determined that the mobile terminal 12 is approaching the child multifunction device 14.

The exemplary embodiment of the present invention has been discussed. However, the invention is not restricted to the exemplary embodiment, and various modifications and changes may be made without departing from the spirit and scope of the invention.

For example, in this exemplary embodiment, the parent multifunction device 16 is used as the management device. However, instead of the parent multifunction device 16, a server may be used. Additionally, the parent multifunction device 16 may serve as the management device and also as one image processing device among a set of image processing devices. That is, the parent multifunction device 16 may be included in candidates of multifunction devices to which a job reservation may be assigned, as in the child multifunction devices 14.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing request management system comprising:
a user terminal comprising a hardware processor used by a user;
a set of image processing devices, each of which comprises a child multifunction device that is configured to have two or more functions selected from a group comprising: printing, scanning, copying, and faxing, the set of image processing devices comprises a first child multifunction device; and
a management device comprising a parent multifunction device that is configured to have two or more functions selected from a group comprising: printing, scanning, copying, and faxing,
wherein:
the user terminal, the set of image processing devices, and the management device being communicatively connected to each other via a network,
the user terminal is configured to:
send, from the user terminal to a first child multifunction device over the network, a user request comprising processing request information for one of the child multifunction devices to perform at least one function of the two or more functions;
the first child multifunction device is configured to:
transfer the user request to the management device over the network in response to the first child multifunction device receiving the user request over the network,
the parent multifunction device is configured to:
receive the user request from the first child multifunction device over the network;
in response to receiving the user request from the user terminal via the first child multifunction device over the network, determine operating states of each of the child multifunction devices and select a subject child multifunction device from the child multifunction devices, based on operating state information indicating an operating state of each of the child multifunction devices, and
send the processing request information received from the first child multifunction device to the subject child multifunction device over the network,
wherein the subject child multifunction device performs at least one function corresponding to the processing request information.

2. The processing request management system according to claim 1, wherein:
the processing request information includes specifying information for specifying a plurality of child multifunction devices from the set of image processing devices; and
the management device selects the subject child multifunction device from among the plurality of child multifunction devices specified.

3. The processing request management system according to claim 2, wherein:

the management device sequentially receives a plurality of items of the processing request information; and the management device selects the subject child multifunction device to which a subject item of processing request information among the plurality of items of processing request information will be sent, from among child multifunction devices other than child multifunction devices specified in a subsequent item of processing request information received after the subject item of processing request information.

4. The processing request management system according to claim 1, wherein:

the user terminal is further configured to:
send start instruction information to the subject child multifunction device, the start instruction information being used for instructing the subject child multifunction device to start processing corresponding to the processing request information, and send holding information to the management device, the holding information being used for providing an instruction to hold processing corresponding to processing request information that has not been started, wherein, upon receiving the start instruction information, the subject child multifunction device starts to execute processing corresponding to the processing request information, the management device is configured to:
store, upon receiving the holding information, the processing request information corresponding to the received holding information in a storage unit and execute holding processing for sending processing stop information for stopping executing processing corresponding to the processing request information to the subject child multifunction device.

5. The processing request management system according to claim 4, wherein the management device executes the holding processing if a predetermined pre-holding time elapses during a period from a time point based on when the subject child multifunction device which executes processing corresponding to the processing request information is selected until when the start instruction information corresponding to the processing request information is sent.

6. The processing request management system according to claim 5, wherein:

the user terminal further configured to:
send pre-holding time extend information for extending the pre-holding time to the management device.

7. A processing request management device that is communicatively connected to a user terminal used by a user and a set of image processing devices via a network, each of the set of image processing devices comprises a child multifunction device that is configured to have two or more functions selected from a group comprising: printing, scanning, copying, and faxing, the set of image processing devices comprises a first child multifunction device, the processing request management device comprising:

a parent multifunction device configured to have two or more functions selected from a group comprising: printing, scanning, copying, and faxing, the parent multifunction device comprising a hardware processor configured to:

receive, from a first child multifunction device over the network, a user request comprising processing request information for one of the child multifunction devices to perform at least one function of the two or more functions, the first child multifunction device receiving the user request from the user terminal;

in response to receiving the user request from the user terminal via the first child multifunction device over the network, determine operating states of each of the child multifunction devices and select a subject child multifunction device from the child multifunction devices, based on operating state information indicating an operating state of each of the child multifunction devices; and send the processing request information received from the first child multifunction device to the subject child multifunction device over the network, wherein:
the subject child multifunction device performs at least one function corresponding to the processing request information.

8. A non-transitory computer readable medium storing a program causing a computer to execute a process, the computer comprising a parent multifunction device configured to have two or more functions selected from a group comprising: printing, scanning, copying, and faxing and is communicatively connected to a user terminal used by a user and a set of image processing devices via a network, each of the set of image processing devices comprises a child multifunction device that is configured to have two or more functions selected from a group comprising: printing, scanning, copying, and faxing, the set of image processing devices comprises a first child multifunction device, the process comprising:

receiving a user request comprising processing request information from the user terminal over the network from a first child multifunction device that received the user request from the user terminal, the processing request information being for one of the child multifunction devices to perform at least one function of the two or more functions;

in response to receiving the user request from the user terminal via the first child multifunction device over the network, determining operating states of each of the child multifunction devices and selecting a subject child multifunction device from the child multifunction devices, based on operating state information indicating an operating state of each of the child multifunction devices; and sending the processing request information received from the first child multifunction device to the subject child multifunction device, wherein:
the subject child multifunction device performs at least one function corresponding to the processing request information.

* * * * *